United States Patent
Kelly

(10) Patent No.: US 10,251,061 B2
(45) Date of Patent: Apr. 2, 2019

(54) CELLULAR OUT OF BAND MANAGEMENT AS A CLOUD SERVICE

(71) Applicant: Tadhg Kelly, Boonton, NJ (US)

(72) Inventor: Tadhg Kelly, Boonton, NJ (US)

(73) Assignee: Tadhg Kelly, Boonton, NJ (US)

( * ) Notice: Subject to any disclaimer, the term of this patent is extended or adjusted under 35 U.S.C. 154(b) by 0 days.

(21) Appl. No.: 15/383,326

(22) Filed: Dec. 19, 2016

(65) Prior Publication Data

US 2017/0180993 A1 Jun. 22, 2017

Related U.S. Application Data

(60) Provisional application No. 62/268,607, filed on Dec. 17, 2015.

(51) Int. Cl.
| | |
|---|---|
| H04M 1/66 | (2006.01) |
| H04W 12/08 | (2009.01) |
| H04L 29/08 | (2006.01) |
| H04W 12/04 | (2009.01) |
| H04W 12/06 | (2009.01) |
| H04W 48/02 | (2009.01) |

(52) U.S. Cl.
CPC ............ *H04W 12/08* (2013.01); *H04L 67/02* (2013.01); *H04W 12/04* (2013.01); *H04W 12/06* (2013.01); *H04W 48/02* (2013.01)

(58) Field of Classification Search
CPC . H04L 9/3271; H04L 63/029; H04L 63/0853; H04L 63/0428; H04L 47/2491; H04L 41/0213; H04W 4/26; H04W 4/021; H04W 28/24; H04W 56/00

USPC ........ 455/410–412.1, 415, 435.1–435.3, 445
See application file for complete search history.

(56) References Cited

U.S. PATENT DOCUMENTS

| | | | |
|---|---|---|---|
| 7,496,950 B2 | 2/2009 | Carley | |
| 8,195,146 B2 | 6/2012 | Prakash et al. | |
| 8,295,157 B1 | 10/2012 | Pimentel et al. | |
| 8,339,991 B2 | 12/2012 | Biswas et al. | |
| 8,387,127 B1 | 2/2013 | Narver et al. | |
| 8,474,016 B2 | 6/2013 | Carley | |
| 8,607,054 B2 | 12/2013 | Ramarathinam et al. | |
| 8,688,104 B2 | 4/2014 | Prakash et al. | |
| 8,850,543 B2 | 9/2014 | Von Bokern et al. | |
| 8,935,523 B1 | 1/2015 | Osburn, III | |
| 8,955,075 B2 | 2/2015 | Von Bokern et al. | |

(Continued)

FOREIGN PATENT DOCUMENTS

| | | |
|---|---|---|
| CN | 102523581 A | 6/2012 |
| CN | 102546672 A | 7/2012 |

(Continued)

*Primary Examiner* — Dai Phuong
(74) *Attorney, Agent, or Firm* — Gearhart Law LLC

(57) ABSTRACT

The described computing system may have a first electronic device capable of being coupled to a first communications network, a second electronic device capable of being coupled to a second communications network, an out-of-band management device capable of communicating with the first electronic device and the second electronic device. The first electronic device may be capable of accessing a remote program via the out-of-band management device thereby providing access to a remotely located second electronic device. In a preferred embodiment, this is done utilizing mobile communications technology.

7 Claims, 4 Drawing Sheets

(56) References Cited

U.S. PATENT DOCUMENTS

| | | | |
|---|---|---|---|
| 9,003,481 B1* | 4/2015 | Haney | H04L 63/101 |
| | | | 713/151 |
| 2010/0250053 A1* | 9/2010 | Grill | G07C 5/085 |
| | | | 701/31.4 |
| 2011/0113250 A1* | 5/2011 | Li | H04L 47/2491 |
| | | | 713/171 |
| 2013/0081112 A1* | 3/2013 | Kelly | H04L 9/3271 |
| | | | 726/4 |
| 2014/0068030 A1 | 3/2014 | Chambers et al. | |
| 2014/0281477 A1 | 9/2014 | Nayshtut et al. | |
| 2014/0372751 A1 | 12/2014 | Silverstone | |
| 2015/0334468 A1* | 11/2015 | Parker | H04N 7/1675 |
| | | | 725/31 |
| 2016/0323114 A1* | 11/2016 | Sulpizio, Jr. | H04L 9/3268 |
| 2016/0357275 A1* | 12/2016 | Ribeiro | G06F 21/35 |
| 2017/0063831 A1* | 3/2017 | Arnold | H04L 63/083 |
| 2018/0047306 A1* | 2/2018 | Hiltunen | G09C 1/00 |
| 2018/0225226 A1* | 8/2018 | Ford | G06F 12/1408 |

FOREIGN PATENT DOCUMENTS

| | | |
|---|---|---|
| WO | WO2008109390 A2 | 9/2008 |
| WO | WO2008109390 A3 | 9/2008 |
| WO | WO2013103959 A2 | 7/2013 |
| WO | WO2013103959 A3 | 7/2013 |
| WO | WO2014100781 A1 | 6/2014 |

* cited by examiner

CELLULAR OUT OF BAND MANAGEMENT AS A CLOUD SERVICE

CLAIM OF PRIORITY

This application claims the priority of U.S. Ser. No. 62/268,607 filed on Dec. 17, 2015, the contents of which are fully incorporated herein by reference in its entirety.

FIELD OF THE EMBODIMENTS

The field of the embodiments of the present invention relates to secure remote management of electronic devices. The present invention may utilize a secure, dedicated channel(s) on a mobile data network to access these electronic devices remotely. Such management access may be granted via a secure cloud based connection thereby removing the need for dedicated hardware at the physical location of the user.

BACKGROUND OF THE EMBODIMENTS

It is estimated that approximately 1.2 billion work-hours are lost annually in the U.S. due to downtime of electronic services and networks, the length of an incident, the recovery time required, and the frequency of such an occurrence. Fortunately, investing in out-of-band management can mitigate much of this cost and squandered productivity by providing tools that help reduce the length of outages, accelerate recovery, and provide IT administrators with the oversight to reduce the risk of recurrence.

Out-of-band management provides a way to log into or access one's network devices via a separate network than which the network data ordinarily travels. There are any number of reasons one may desire to access a network in this fashion with security being the most common. Additionally, out-of-band management solutions can provide an alternative means to communicate with network devices on the remote network in order to restore communication capabilities, reboot nonresponsive devices, and tweak configuration parameters.

As noted, one reason for out-of-band management is to allow for emergency access to physically remote devices in the event the primary network becomes unavailable. Out-of-band access provides a special "back door" one may use to troubleshoot the main network. Even still, out-of-band access can be used if an external company, or third party, is managing some or all of one's personal or business network devices. Out-of-band implementation prevents the external company from accessing the data on the network, while still allowing them to access the network devices. Thus, there are numerous benefits and advantages of implementing out-of-band management on a particular network. However, despite its advantages, there is still a number of drawback with the current implementations of the technology.

One traditional out-of-band management method is to connect a modem to the console port of the network device. This methodology has several obvious limitations. It requires that the infrastructure supports a phone line and modem for every device being managed, thereby preventing scalability. Further, it is exceedingly difficult to secure modem lines. In some cases, users will have the modem physically turned off when not in use, but then somebody must be located at the remote site must turn the modem on/off to allow access. Also, modems and phone lines tend to be very slow in terms of data transfer.

Thus, most people are turning to Internet or cellular broadband communications to fulfill out-of-band communication and access needs. While the internet generally provides a wider coverage range, cellular broadband networks are often more economical and mobile and are typically more reliable than, for example, satellite communication under inclement weather conditions. Cellular broadband based out-of-band management solutions can be applied to a wide variety of different types of remote network management applications. Cellular based out-of-band communication lends itself particularly well to almost any remote network application that includes network equipment located in distant, hard-to-reach locations where connection via dial-up or land-line is either impractical or impossible.

However, there is a need to not only offer such a cellular based service, but to also provide access to such a service in any number of locations. Offering cellular out of band management as a cloud service meets these needs. Further, security protocols must be in place to prevent security breaches and loss or theft of information. The present invention and its embodiments meets and exceeds these objectives.

REVIEW OF RELATED TECHNOLOGY

U.S. Pat. No. 8,688,104 pertains to systems and methods providing remote management over a wireless wide-area network (WWAN) using short messages. In one embodiment, a computing device may include an in-band processor, a wireless transceiver configured for communications over a WWAN, and an out-of-band (OOB) processor capable of communicating over the WWAN using the wireless transceiver irrespective of an operational state of the in-band processor. The OOB processor may be configured to receive a short message via the wireless transceiver, determine whether the short message originated from a trusted remote computing device, and execute at least one operation indicated by the short message in response to determining that the short message originated from a trusted remote computing device.

U.S. Pat. No. 8,474,016 pertains to a computer network management apparatus and method for remotely managing a networked device. The apparatus and method includes a management processor which is in direct communication with the networked device. The apparatus and method provides access for remotely and securely managing a networked device. The apparatus and method further separates management communications from user communications to ensure the security of the management communications. The apparatus and method further includes network and power monitoring and notification systems. The apparatus and method further provides authentication and authorization capabilities for security purposes.

U.S. Pat. No. 7,496,950 pertains to a computer network management system with an embedded processor, an analog communication means and a digital interface for network management provides a system for remotely and securely managing a network. Backup power in the form of an uninterrupted power supply, or other power means as appropriate, allows the modem to provide power outage notification to a remote site. The system further provides authentication and authorization capabilities for security purposes.

Various devices are known in the art. However, their structure and means of operation are substantially different from the present disclosure. The other inventions also fail to solve all the problems taught by the present disclosure. At least one embodiment of this invention is presented in the drawings below and will be described in more detail herein.

SUMMARY OF THE EMBODIMENTS

In general, the present invention and its embodiments provide for offering cellular out-of-band management as a cloud service making it thereby accessible from virtually any location. One instrumental aspect of making such an offering is the security requirements of the system. Securing both the identity of the accessing user and the compartmentalization of the grouping of out-of-band devices so that each customer's devices are only accessible by credentialed employees or agents of that customer is paramount to allow for such implementations.

To accomplish these objectives, the remote devices may be grouped into domains accessible into to properly credentialed users of that domain. Domains are then preferably assigned to specific customer accounts. Third party managed network providers can also be enabled to access certain customer devices if requested. This may generally allow for completely separate "domains" of out-of-band devices accessible through a central secure portal ensuring there is no "crosstalk" between domain devices or users.

Thus, the system provides a two prong security system: security for cloud access and a separate security for the OOB access. The cloud access to the system is restricted via an authentication system and may further be restricted or secured due to a hardware encryptor. A "domain key" can then be loaded into the gateway for use by that user to access the devices on their particular domain. This key preferably matches a key in the OOB device thereby allowing access to only those users who originate from the OOB gateway. This, in turn, prevents access from multiple points and forces all OOB traffic through a single access point. Such protocols can make it easier to secure and audit all traffic on the OOB network.

In one embodiment of the present invention there is, a computing system having a first portal capable of being coupled to a first communications network; a second portal capable of being coupled to a second communications network; an out-of-band processor capable of communicating with the second portal; and at least one electronic device capable of accessing a remote program via the first portal providing access to a remotely located second electronic device.

In another embodiment of the present invention there is a machine readable storage medium comprising a plurality of instructions that when executed results in a computing device: at least one user accessing a dedicated network via an electronic device, wherein the dedicated network is accessed via web or mobile based portal operating over at least one first communications network; a portal manager identifying the at least one user and credentials associated with the at least one user; the out-of-band management system providing at least one accessible networked device; the at least one user selecting the at least one accessible networked device; establishing a connection with the at least one accessible networked device, wherein the connection is established by supplying the credentials to the at least one accessible networked device; the at least one accessible networked device generating and encrypting a key; and sending the key to the portal manager, wherein the key is decrypted by the portal manager.

In general, the present invention succeeds in conferring the following, and others not mentioned, benefits and objectives.

It is an object of the present invention to provide a management system that can securely access from hardware in a remote location.

It is an object of the present invention to provide a management system that utilizes cellular communications technology.

It is an object of the present invention to provide a management system that removes the need for dedicated hardware.

It is an object of the present invention to provide a management system that is more cost effective for consumers.

It is an object of the present invention to provide a management system that is less labor intensive.

It is an object of the present invention to provide a management system that uses industry leading security protocols.

It is an object of the present invention to provide a management system that requires separate security protocols to access the cloud system and the OOB device.

It is an object of the present invention to provide a management system that allows for streamlined monitoring and auditing of all OOB network traffic.

It is an object of the present invention to provide a management system that eliminates user access from multiple access points.

DESCRIPTION OF THE PREFERRED EMBODIMENTS

Figure 1:
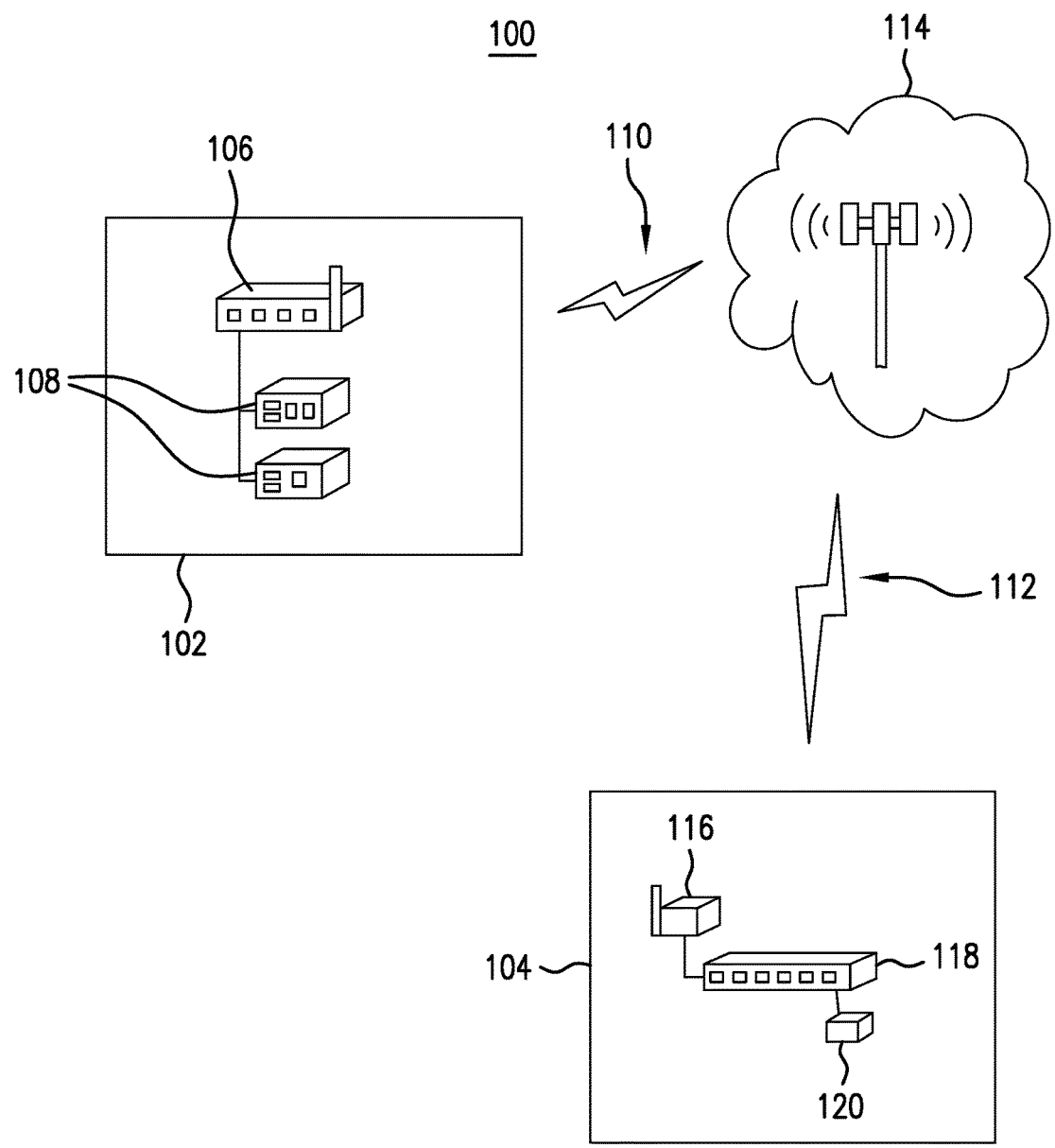
FIG. 1 is a high level overview of a prior art out-of-band management system.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Referring now to FIG. 1, there is a high level overview of a typical prior art system that utilizes remote management protocols or "out of band" management. The system 100 generally comprises a first location 102 and a second location 104 with the first location 102 being remote from the second location 104. The first location 102 is "linked" with the second location 104 via a communication network 114 and hardware sufficient to establish an out-of-band connection.

At a first location 102, there may be a first serial console 108 and a first out-of-band (OOB) set up 106. The second location 104 may generally have a second OOB set up 116, a second serial console 118, and a power control 120. The locations of the equipment may be provided for at either location or one location or the other. The first location 102 communicates with the second location 104 using a first signal 110 and a second signal 112, and alternatively more than two signals, to communicate with the respective location. In practice, this would afford an IT professional or other user to access a remote hardware set up to push updates, provide system maintenance as needed, and provide system access to a remote electronic device, amongst other functionalities.

Figure 2:
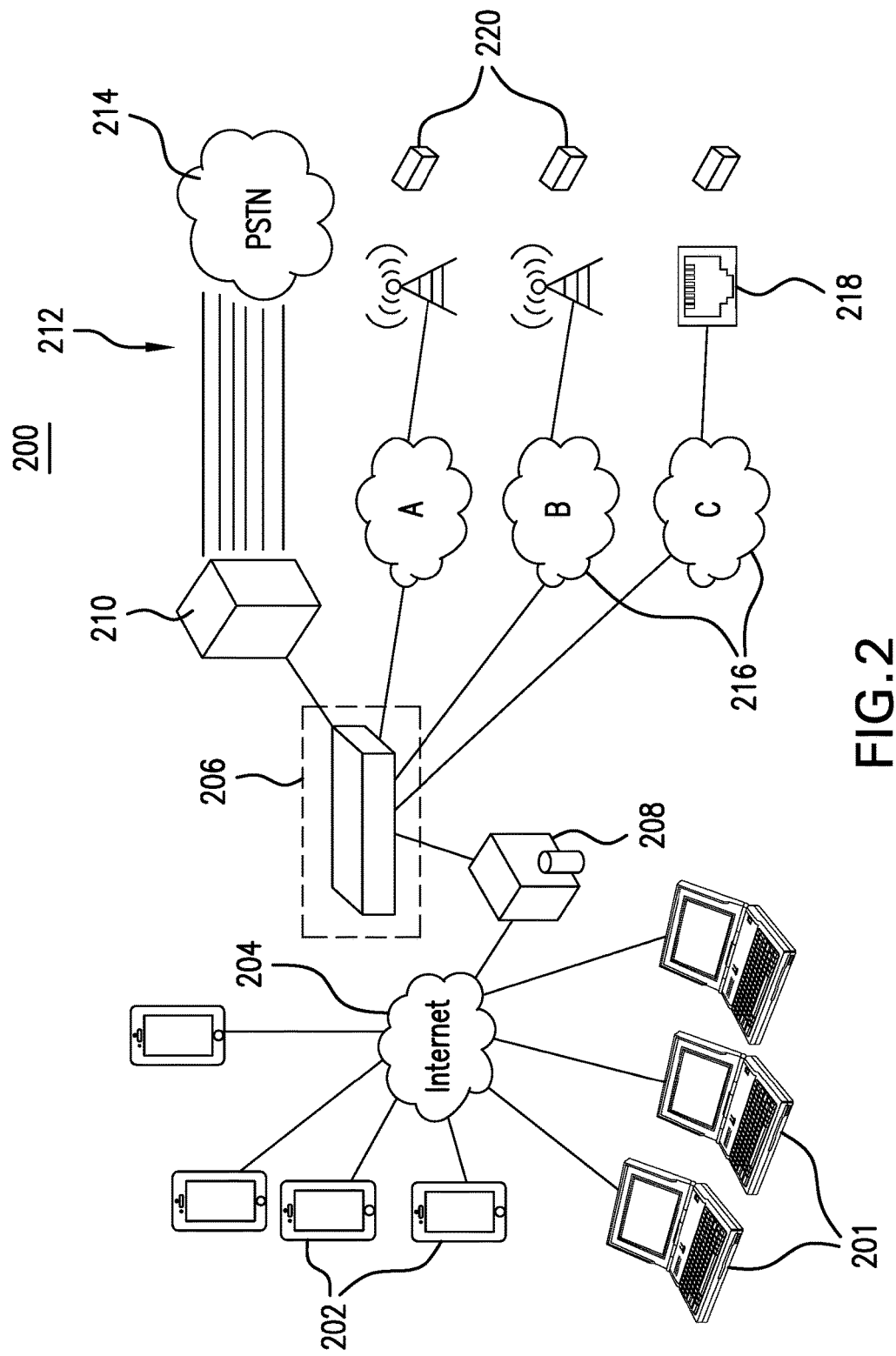
FIG. 2 a high level overview of the system architecture of an embodiment of the present invention.

Referring now to FIG. 2, there is an embodiment of the present invention. Here the system 200 comprises a plurality of customers having first electronic devices 201 and second electronic devices 202, a web portal 208, an enterprise portal appliance (EPA) 206, and an OOB device 220. In some embodiments, this configuration further comprises a communications network 204 such as the internet and a cellular network 216.

In practice a remote user, can employ their first electronic device 201 or second electronic device 202 to access a first communications network 204 such as the internet. Via the communications network 204, the requisite software can be accessed via the web portal 208 (cloud), with the web portal 208 being communicatively connected to the EPA 206. The EPA 206 facilitates communication between the mobile device 201 and/or electronic device 202 with the OOB device 220 via a cellular network 216. The cellular network 216 operates off cellular towers or WAN connections (over Ethernet) 218 thereby allowing the remote user to access the OOB device 220 over a cellular communications network 216. In some embodiments, if no cellular network is available, then a traditional telecommunications set up 210 using analog communications 212 and a public switched telephone network (PSTN) 214.

An advantage of the present invention and its embodiments is that it requires the consumer or customer operating the mobile device 201 or electronic device 202 to bear limited costs and training. Further, the system is secured through multiple authentication layers, described below, and provides access, in some embodiments, to the web portal 208 through a secure VPN. In other embodiments, access may be provided through the internet or the OOB management cloud. The EPA 206 provides a direct linkage between these consumers and the multiprotocol label switching (MPLS) or cellular networks 216. The system 200 and its configuration shown herein are intended to only be illustrative and other configurations may exist and be contained under the purview of this invention.

Figure 3:
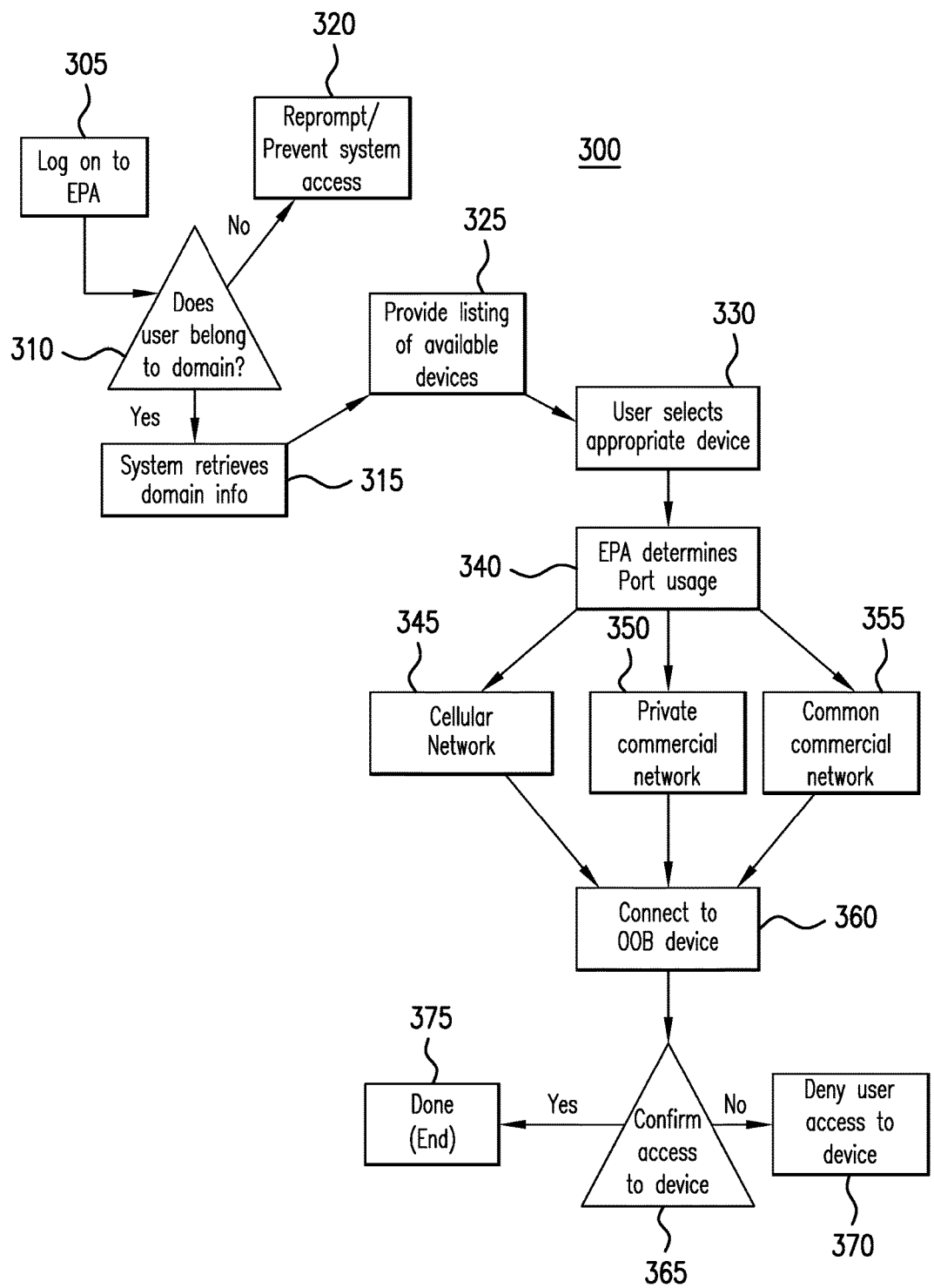
FIG. 3 is a flow chart detailing a methodology of accessing a remote site via a cloud platform.

In FIG. 3, there is a flowchart describing a process of logging on to an embodiment of the system described in FIG. 2. The method 300 begins in step 305, where a user logs on to the EPA.

In step 310, the system then checks to see which domain, if any, the user belongs to. If the system determines the user belongs to no domain associated with the system, then the system may re-prompt the user, in step 320, to enter alternative credentials. In other embodiments, where the user does not belong to any domain, the system will simply prevent the user from accessing the system and not allow subsequent entry attempts. If however, the system verifies the domain to which the user belongs, the user is granted access and the process moves to step 315.

In step 315, the system retrieves the domain information and in step 325, provides a listing of available devices to which the user has access. The devices may include but are not limited to lap top computers, desktop computers, tablets, PDAs, gaming systems, smart televisions, kiosks, and the like or some combination thereof. The user may be able to access all or some or only one device maintained on the particular network. This may largely depend on the number of network devices and the access credentials provided to the particular domain for which the user is a member.

In step 330, the user can then select the appropriate device to access via the OOB management system. To select said device, the user may simply use a point and click methodology to choose the desired device. Alternative means such as speech or gestures may be used in some embodiments.

In step 340, the EPA determines which port (preferably Ethernet) to use for access. There may be multiple Ethernet or other ports on a particular device and each of these ports may direct traffic to a physically separate network and topology. As shown in steps 345, 350, and 355 such exemplary networks may be a cellular network, private commercial network, or a common commercial network respectively. In other embodiments, other such networks or combinations of networks may be accessed.

In step 360, a connection is established with the OOB device. This connection in confirmed in step 365. If no connection can be confirmed, then in step 370, the user is denied access to the device. In some embodiments, the user may be able to attempt to reestablish the connection.

In step 375, the connection has been established and confirmed and the process ends.

Access from the cloud, as described above, may be achieved via any existing security platform such as two factor authentication or a certificate based authentication. Even further, an IPSEC VPN tunnel, may be employed, to the cloud service from the customer or client to the cloud service host. In some embodiments, a hardware encryptor may be utilized at the customer end to provide enhanced levels of security. Access through the encryptor may be dependent on the usage of various keys, as described herein, and only properly keyed devices will be granted access to the cloud system. The customer may invoke their accepted security policy, such as TACAS+, RADIUS, or active directory access to the hardware encryptor.

Figure 4:
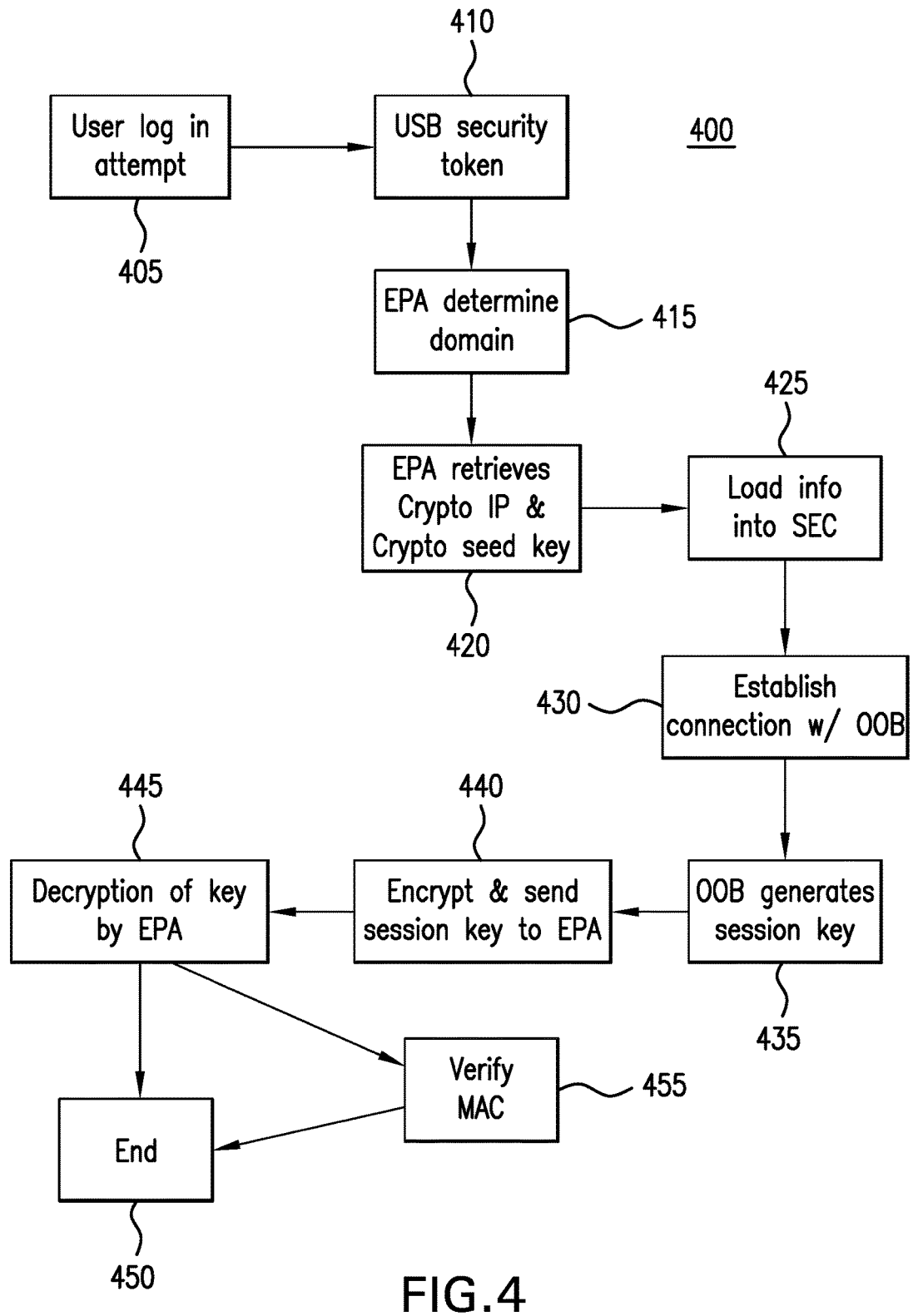
FIG. 4 is a flowchart illustrating the implementation of a security/encryption protocol in accordance with an embodiment of the present invention.

In FIG. 4, there is a flowchart outlining an embodiment of the security and authentication processes that may occur when a user attempts to access the OOB system, after being properly credentialed to access the cloud service, as described in FIG. 3. Here, the security and authentication method 400 begins in step 405 with a user log in attempt to a particular domain.

In step 410, the user may provide a USB security token or other form of credentials to provide these credential to the system for verification and authentication. Such credentials may be manually entered or may be retrieved by the user's electronic device from information stored thereon.

In step 415, the system or EPA initially discerns to which the domain the user belongs, as the particular domain will influence the various security identifiers and keys required for a successful and secure log in by the user.

In step 420, the EPA retrieves a user identifier which may be a domain cryptoID comprising anywhere from 8 to 64 digits and preferably about 16 digits. Further, a key is retrieved which may be a crypto seed key and in some embodiments may be a 128, 192, or 256 bit AES private key.

In a preferred embodiment, both of the domain cryptoID and the crypto seed key are unique to each domain present and accessible through the system. In turn, for desired system functionality, each of these credentials should be loaded on to each domain's OOB devices.

In step 425, the EPA loads the retrieved credentials into a secure connection engine (SEC) module. The user can then access a listing of the devices accessible from that particular account associated with the domain. Once the user selects the appropriate remote electronic device a connection is attempted to be established with the OOB device in step 430. The OOB device requests the cryptoID of the user from the EPA and confirms that access is allowed by the user.

In step 435, the OOB device uses a random number generator to generate a session key. This session key may be of a varying length and may be dependent on the length of the seed key. In some embodiments, the session key is the same length as the seed key.

In step 440, the session key is then encrypted with the seed key and then sent to the EPA.

In step 445, the decryption of the session key occurs using the same seed key stored in the table of the EPA. Preferably, all key exchanges are signed with a message authentication code (MAC) or other identifying signature. In step 455, the MAC is optionally checked to verify that there has been no tampering with any of the keys, identifiers, etc. or other attempted security breaches using improper credentials or access methodologies. The process ends in step 450 with the user establishing a secure remote access to the OOB device from a remote location.

The OOB device built-in security as described above to protect the system from intrusions. For example, an extraneous user could still attempt and be successful in logging into the VPN by impersonating a cellular tower. This would "trick" the system into thinking the attempt is emanating from a legitimate source thereby allowing this individual to access the system. However, the OOB device's built-in security (encryption) would prevent this access from occurring since the encryption would prevent further access after gaining access to the private VPN.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method of using a portal manager within an out-of-band management system comprising:
    detecting a user accessing a dedicated network via an electronic device, wherein the dedicated network includes a cellular communication network;
    identifying a crypto identifier (ID) and a seed key associated with the user and a domain, wherein the user belongs to the domain;
    providing an accessible networked device associated with the domain to the user; detecting a selection of the accessible network device by the user;
    attempting a connection with the selected accessible networked device, wherein the connection is attempted by supplying the crypto ID and the seed key to the selected accessible networked device;
    receiving a session key generated and encrypted by the selected accessible network device, wherein a length of the session key is dependent on a length of the seed key;
    decrypting the session key using the seed key; and
    establishing the connection between the user and the selected accessible network device as a secure remote access after decrypting the session key.

2. The method of claim 1 further comprising:
    verifying a message authentication code at the end of a message between the electronic device and the selected accessible networked device.

3. The method of claim 2, wherein the message authentication code is used to verify one or more of the crypto ID, the seed key, and the session key.

4. The method of claim 1, wherein the crypto ID and the seed key for the domain are separate and distinct from another crypto ID and another seed key for another domain associated with the user.

5. The method of claim 1, wherein the length of the session key is equal to the length of the seed key.

6. The method of claim 1, further comprising:
    protecting the system from an intrusion associated with a cellular tower impersonation by encrypting the connection with the session key.

7. A non-transitory machine readable storage medium with instructions stored thereon for providing a portal manager based out-of-band management the instructions comprising:
    detecting a user accessing a dedicated network via an electronic device, wherein the dedicated network includes a cellular communication network;
    identifying a crypto identifier (ID) and a seed key associated with the user and a domain, wherein the user belongs to the domain;
    providing an accessible networked device associated with the domain to the user;
    detecting a selection of the accessible networked device by the user;
    attempting, a connection between the electronic device and the selected accessible networked device, wherein the connection is attempted by supplying the crypto and the seed key to the selected accessible networked device;
    receiving a session key being generated and encrypted by the selected accessible network device, wherein a length of the session key is dependent on a length of the seed key;
    decrypting the session key using the seed key; and
    establishing the connection between the electronic device and the selected accessible network device as a secure remote access after decrypting the session key.

* * * * *